United States Patent Office 3,266,230
Patented August 16, 1966

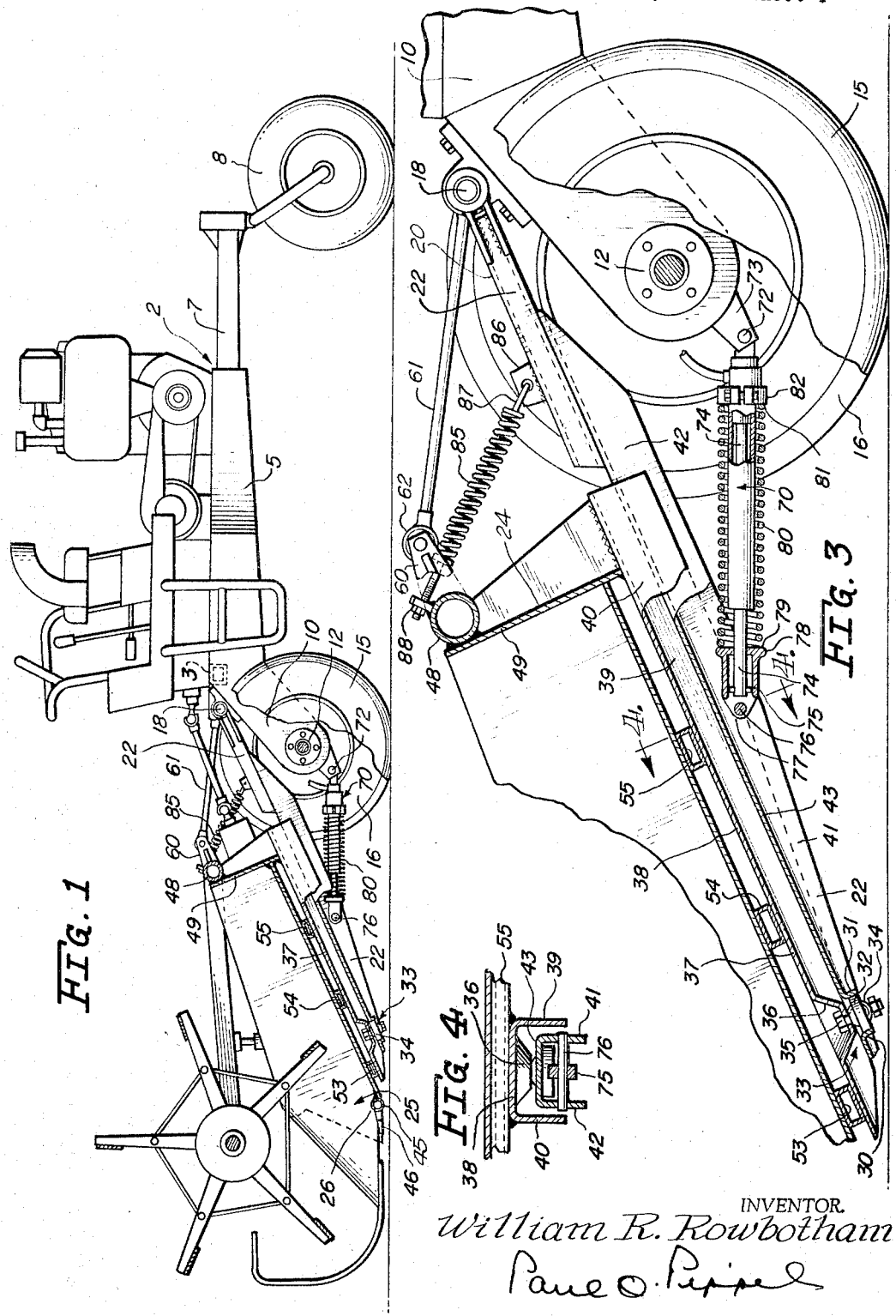

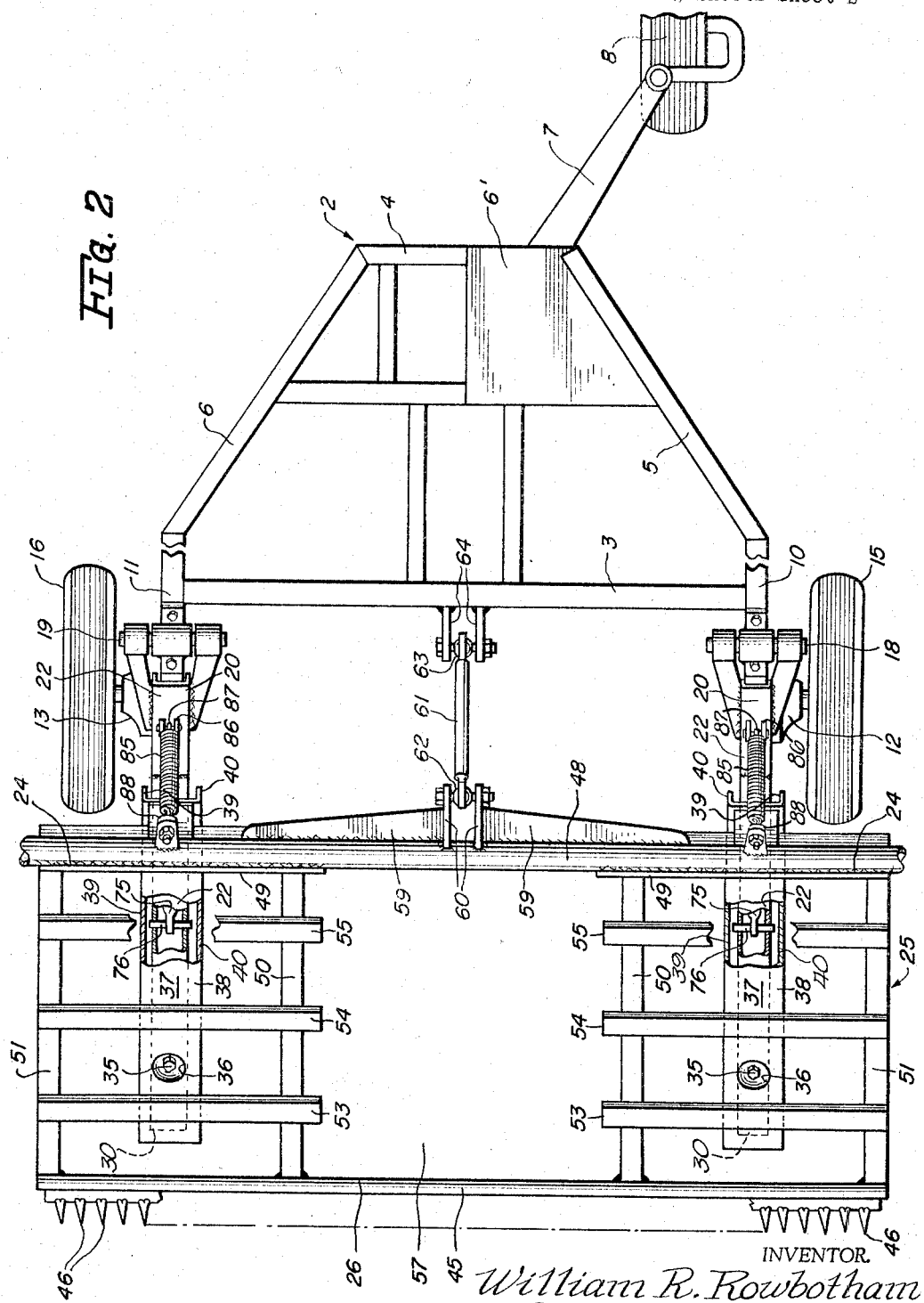

3,266,230
RADIAL FLOAT PLATFORM FOR HARVESTERS
William R. Rowbotham, Hamilton, Ontario, Canada, assignor to International Harvester Company, Chicago, Ill., a corporation of New Jersey
Continuation of application Ser. No. 375,414, June 8, 1964. This application Apr. 26, 1965, Ser. No. 453,551
10 Claims. (Cl. 56—208)

This invention relates to harvesting machines and more specifically to a novel platform structure which is adapted to float universally to follow varying land contours. This application is a continuation of my application Serial No. 375,414, filed June 8, 1964, for Radial Float Platform for Harvesters.

A general object of the invention is to provide a novel platform mounting for a harvester in which the platform is supported to tilt laterally as well as fore and aft.

The invention comprehends the provision of novel linkage for mounting a harvester platform from a supporting structure, wherein the linkage includes mechanism for raising and lowering the platform.

A more specific object of the invention is to provide novel mounting for the linkage with the platform by means of ball connections, the linkage comprising a pair of actuating rams connected between an associated carrier and the platform adjacent the opposite ends thereof and an intervening third point link at an elevation above the rams.

A further object of the invention is to provide a novel mounting linkage for a harvesting platform from an associated carrier, wherein the linkage comprises rams connected between opposite ends of the platform and the carrier, the rams having connections with the platform through means acted on by spring means which react between the carrier and the frame of the harvester platform, the spring means serving to yieldably support the platform in conjunction with a third point link which extends from the platform substantially midway between the hydraulic rams and the carrier, the rams in the lowered position of the platform being exhausted of fluid and thus in no way inhibiting the action of the springs which serve as the primary support for the platform.

These and other objects and advantages inherent and encompassed in the invention will become more apparent from the specification and the drawings, wherein:

FIGURE 1 is a side-elevational view of a windrower incorporating the invention shown partially in longitudinal section;

FIGURE 2 is a skeletal plan view with parts removed and in section;

FIGURE 3 is an enlarged sectional view of the platform; and

FIGURE 4 is an enlarged sectional view taken on line 4—4 of FIGURE 3.

Describing the invention in detail and having particular reference to the drawings, there is shown a carrier generally designated 2, which in the present instance is of the conventional type and comprises a somewhat trapezoidal erally designated 2, which in the present instance is of the framework including front and rear transverse members 3 and 4 and intervening side members 5 and 6. The frame members 4 and 5 incorporate a box section structure at their juncture which mounts a rearwardly extending beam member 7 to which is mounted a tail wheel 8.

The members 5 and 6 have fore-and-aft forward extensions 10 and 11 with drop axle housings 12 and 13 which mount the forward or drive wheels 15 and 16.

The forward extensions 10 and 11 are provided with coaxial transversely extending stub-axles 18 and 19 which pivotally mount the rear extremities 20 of downwardly and forwardly extending platform support arms 22.

Each arm 22 extends under the associated end portion 24 of a harvesting platform generally designated 25 to adjacent the forward edge 26 of the platform. The forward end 30 of each arm 22 is provided with a socket 31 which receives the outer race 32 of a ball joint connection generally designated 33. Said connection in addition to the socket 32 including a ball 34 which fits into the race 31 and has universal angling movement with respect thereto. The ball 34 is connected by means of a nut and bolt 35 to a depressed embossment 36 on the forward end of the fore-and-aft extending frame member 37 of inverted channel construction which has a top web 38 and a pair of laterally spaced depending side webs 39 and 40 which loosely embrace the member 22 and cooperate with the side webs 41 and 42 thereof to limit the lateral angling movement of the platform frame with respect to the support arms. It will be noted that the web 38 is spaced vertically from the top web 43 of the associated arm 22, said arm 22 being also of inverted channel shape whereby the platform is accommodated in rocking movement on a transverse axis with respect to the arms 22.

The platform structure includes a front cutter bar slab 45 which is provided with forwardly projecting guards 46 on which reciprocates an associated sickle (not shown). The member 45 forms the front of the platform and the rear of the platform is formed by an elevated transverse member 48 which is connected by vertical panel walls 49, 49 to the subframe structure constituting the end portions 24 and 25, each of which includes inboard and outboard fore-and-aft extending members 50 and 51 as well as the associated beam 37 which is disposed intermediately of the members 50 and 51. Beams 37, 50 and 51 are connected at their forward ends to the bar 45. A plurality of transverse brace members 53, 54, and 55 are provided interconnecting the members 37, 50 and 51. It will be seen that the panels 49 connect with the rear ends of the members 37, 50 and 51 and that the element 48 is spaced a considerable distance above the plane of the platform as defined in part by subframe structures so as to allow the crops to pass thereunder as they are discharged by associated conveyor means from opposite ends of the platform lengthwise of the mower into a central windrow opening 57, as well known in the art.

The central portion of the member 48 is formed with a strengthening gusset plate structure 59 which is provided with a pair of rearwardly extending ears 60 between which projects the forward end of an upper link 61 connected as by ball joint 62 thereto, the link 61 having its rear end connected by a ball joint 63 to the ears 64 which are connected to the front transverse beam member 3 of the carrier substantially medially thereof.

The platform is actuated to raised and lowered positions by means of the rams generally designated 70 each of which comprises a cylinder portion 71 which is pivotally connected as at 72 to an ear 73 mounted on the associated pedestal 10 or 11. A piston stem 74 operates within the cylinder and is connected by casting 75 to the side walls 41 and 42 of the associated member 22 intermediate its ends as by transverse pin 76 which passes through ears 77 which are formed on the casting sleeve. It will be noted that the piston stem 74 is slidable lengthwise within the sleeve 75 and abuts against the pin 76 against which it reacts in raising the platform. The sleeve 75 has an enlarged annular portion 78 at its rear end which affords a seat as at 79 for one end of a compressing spring 80 which at its other end seats as at 81 against an abutment 82 which is adjustably clamped or secured to the cylinder 71. It will be observed that the clamp or the adjustable abutment 82 is movable lengthwise on the cylinder and therefore determines the loading on the spring 80 which serves to support the platform floatingly upon the cylinder being deactivated wherein the platform is in the lowered or operating position. Inasmuch as the platform is somewhat overbalanced forwardly of the connections at 35 a counterbalancing spring 85 is provided above each arm 22 and has its lower end 86 connected as at 87 to an ear on the associated arm 22 intermediate its ends and has its upper end connected as at 88 to a rearwardly extending ear on the crossmember 48 of the platform.

It will be readily noted that upon actuation of the operating rams 70, the platform will be raised to different operating positions or to an inoperating position. In order to utilize the floating feature, the rams are de-energized or collapsed and the platform then rides or is sustained in its operating position by means of the springs 80. It will be readily appreciated that when the platform tilts laterally or upwardly the appropriate movement is accommodated by the ball joints 35 as well as by the action of the elements 75 which slide on the stem 74 of the associated ram. The position of the platform is determined, of course, by the setting of the springs 80 and this is accomplished by positioning the seating structure 82 along the length of the ram. The counterbalance of the springs 85 obtains a distribution of the platform weight in such manner that it very readily tends to float upon the cutter bar guard fingers 46 meeting any obstruction.

What is claimed is:

1. A vehicle, a pair of arm means pivoted on the vehicle on a horizontal axis, ram means connected to the vehicle at one end and having universal connection with said arm means at the other end, a platform, ball and socket connections supporting said platform on the arm means adjacent the forward end thereof, and stabilizing means between said arm means and the rearward end of said platform.

2. The invention according to claim 1 and said platform having portions loosely embracing said arm means and abuttable therewith for restricting lateral tilting of the platform.

3. The invention according to claim 1 and means serving as universal connections between said ram means and said platform.

4. The invention according to claim 3 and said means serving as universal connections comprising a sleeve with a bore coaxial with the respective ram means, said ram means having a piston rod extending into the bore, and a pivot pin extending angularly to the rod in the path of movement thereof for abutment thereby and connected to the platform.

5. The invention according to claim 4 and spring means sleeved over the ram means in abutment with the sleeve, and means on the ram means serving as a reaction abutment for the spring means.

6. The invention according to claim 5 and ram means including a cylinder and said reaction abutment comprising a collar sleeved over the cylinder and means selectively securing said collar in different positions along the length of the cylinder to effect adjustment of the spring means.

7. The invention according to claim 1 and a link universally connected to the vehicle and to the platform intermediate said pair of arm means at an elevation above the level of said forward edge of the platform.

8. The invention according to claim 1 and said stabilizing means comprising spring means connected between the platform and respective arm means.

9. A vehicle, a pair of arm means pivoted on the vehicle on a horizontal axis, ram means connected to the vehicle at one end and at the other end having universal connection with the arm means intermediate the ends thereof, a platform having a forward edge, ball joint connections supporting said platform adjacent to its forward edge on the arm means adjacent the forward ends thereof, and stabilizing means between said arm means and the rearward end of said platform.

10. The invention according to claim 9 and said platform having inverted U-shaped members overlying and loosely embracing respective arm means for lateral abutment therewith to limit certain relative movements therebetween.

No references cited.

ABRAHAM G. STONE, *Primary Examiner.*

RUSSELL R. KINSEY *Examiner.*